UNITED STATES PATENT OFFICE.

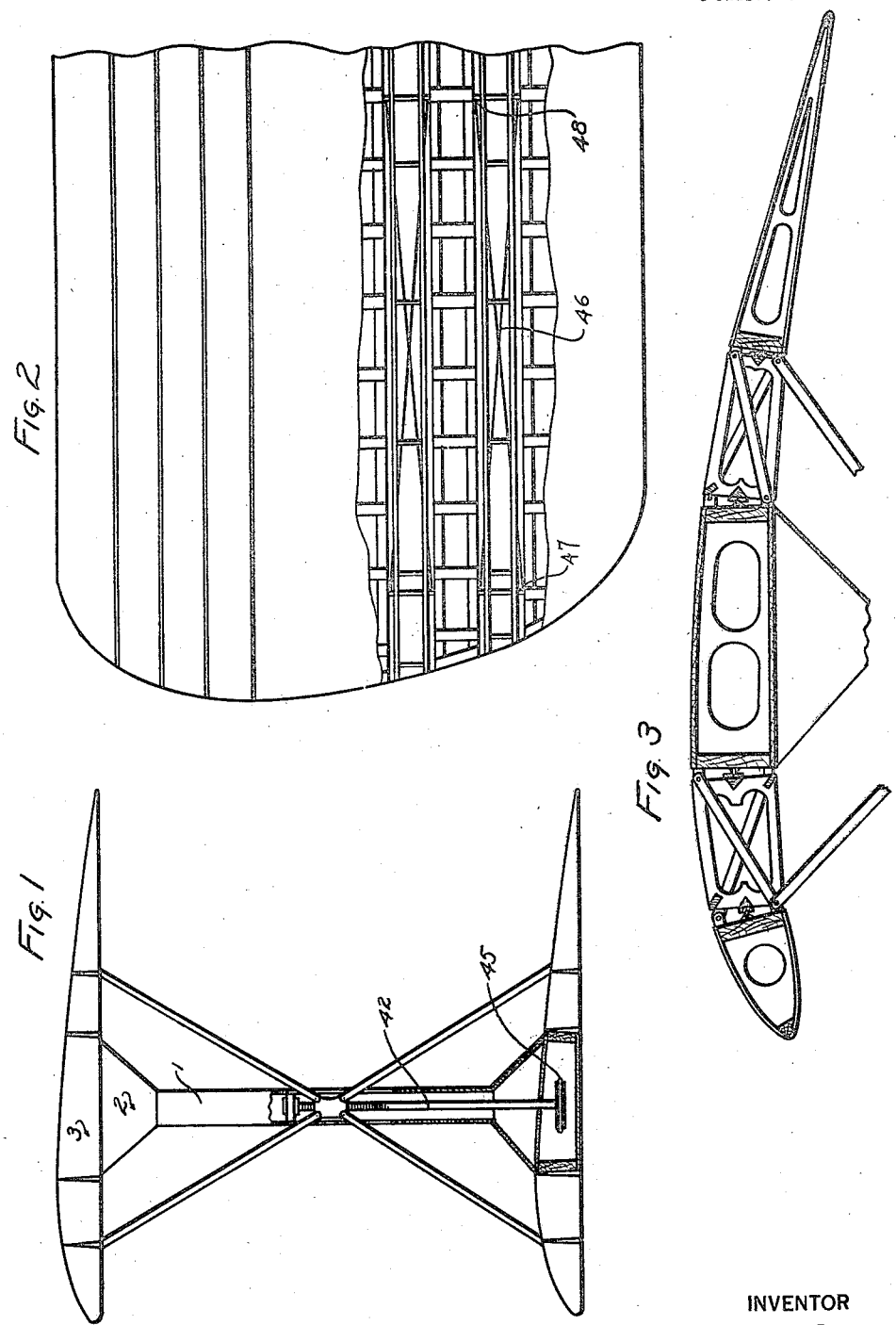

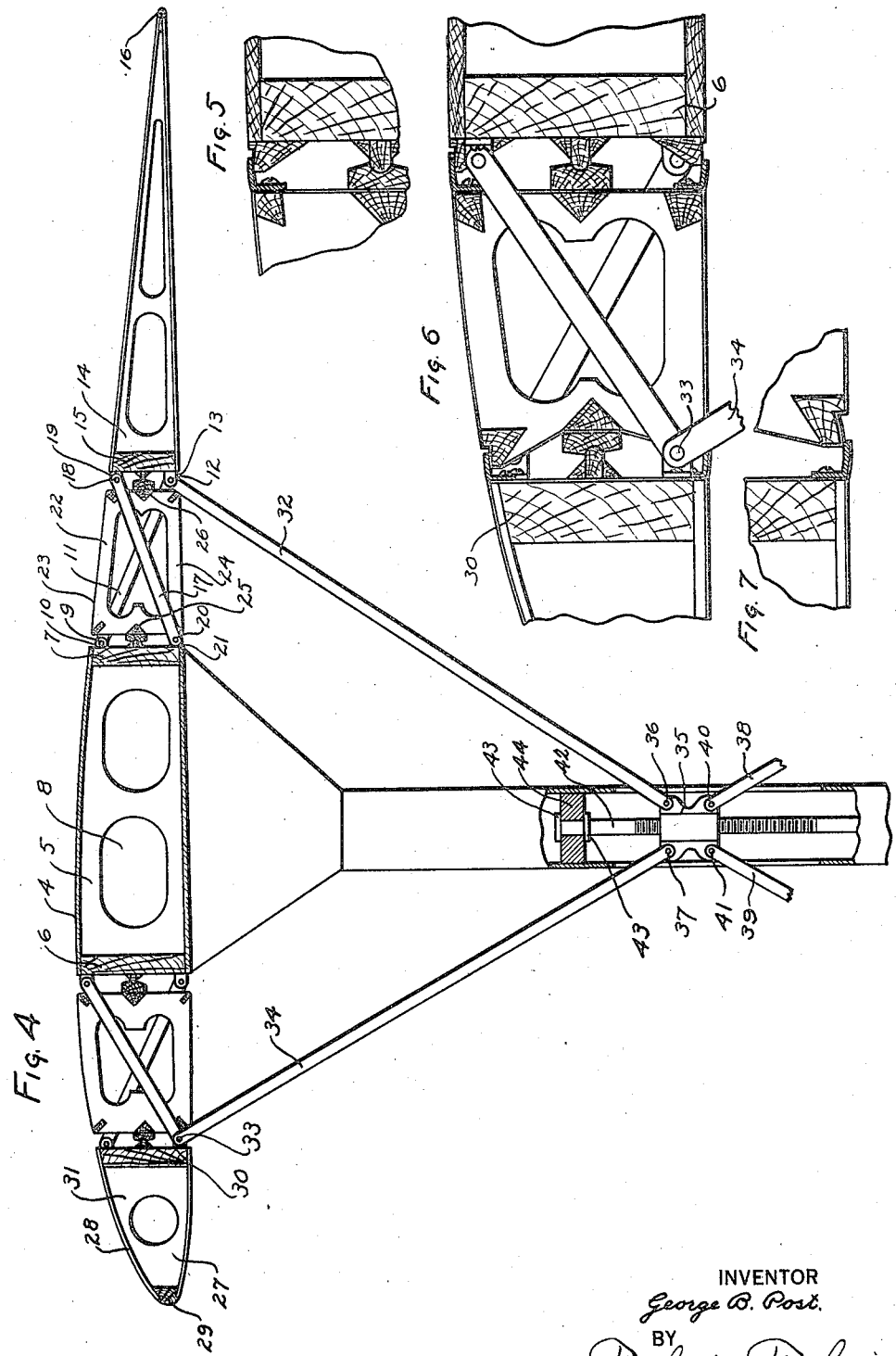

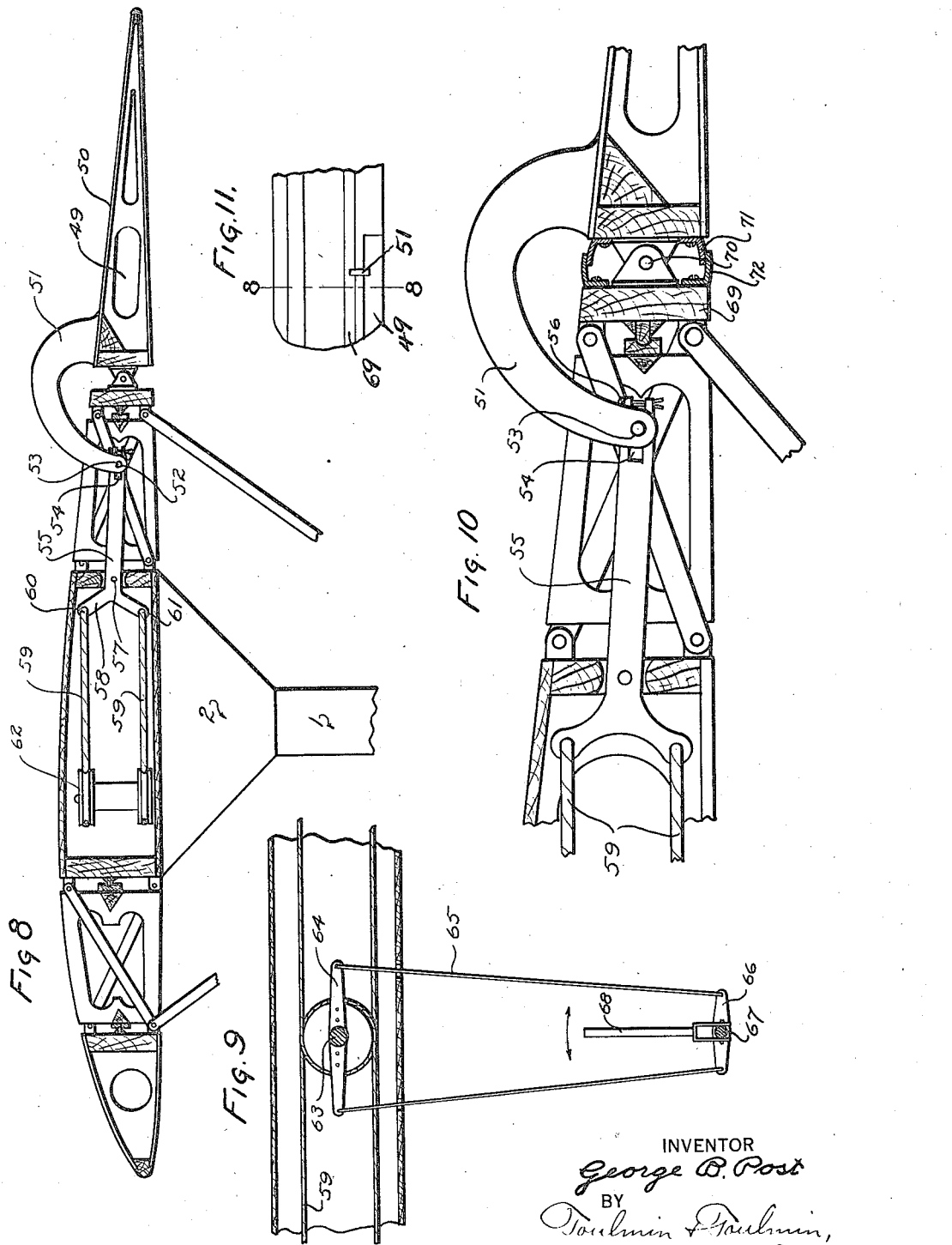

GEORGE B. POST, OF OGDENSBURG, NEW YORK, ASSIGNOR TO HUFF, DALAND & COMPANY, INC., OF OGDENSBURG, NEW YORK, A CORPORATION OF DELAWARE.

AIRPLANE.

1,423,681.   Specification of Letters Patent.   Patented July 25, 1922.

Application filed March 25, 1921. Serial No. 455,578.

*To all whom it may concern:*

Be it known that I, GEORGE B. POST, a citizen of the United States, residing at Ogdensburg, in the county of St. Lawrence and State of New York, have invented certain new and useful Improvements in Airplanes, of which the following is a specification, reference being had therein to the accompanying drawing.

My invention relates to airplanes and in particular to a mechanism and method of altering the curvature of plane structures.

The object of my invention is to provide a plane surface, the camber of which may be varied. It is another object of my invention to provide a plane surface in which the chord may be varied. It is an additional object of my invention to provide a plane surface in which both the camber and the chord may be varied. It is an object of my invention to provide a plane surface in which the angle of incidence may be varied if desired and simultaneously the camber and chord varied.

It is an object of my invention to provide a wing surface which will permit of varying the speed of the plane and will also permit of maintaining the lateral balance of the plane or its equilateral equilibrium without varying the angle of incidence or warping the planes. It is an object of my invention to be able to vary the speed of the plane by varying the camber and chord of the wing surface and still vary the angle of incidence if that is desired, but it is not essential to my invention and forms only one phase of it.

It is a further object of my invention to increase the lift of the plane surface at will. It is another object of my invention to increase the climbing power of the plane surface at will.

It is a further object of my invention to provide a wing structure in combination with ailerons which will permit of the adjustment of the wing surface with a varying camber and also the adjustment independently or simultaneously of the aileron surfaces.

It is a further object of my invention to provide a system of control for these several purposes in adjusting the wing surfaces. It is my object to provide a method of controlling the performance of an airplane which will control its speed and which will control its lateral balance for the performance of all of the evolutions which may be necessary.

My invention is especially useful in landing a machine of high normal speed in situations where a restricted landing speed is desired. This may become desirable because of the high landing speed of the plane, the rough character of the terrain, or the restricted area of landing, such as on the deck of a battle ship. In types of airplanes where great speed is desired in flight the difficulty has always been encountered of a high landing speed. It is my object to provide a plane surface which can be employed in a ship of this character but which will have a very material decrease in landing speed. In one design I have provided, of which the accompanying illustrations are typical, a plane of approximately 60 miles an hour normal low speed in flight which will have a landing speed of approximately forty miles an hour, when deeply cambered.

It is also my object to provide a structure which will maintain its streamline characteristics despite its being adjusted to varying positions and varying cambers.

Referring to the drawings:

Fig. 1, is a side elevation of a pair of planes, their interlocking controls, and the mechanism for actuating those controls;

Fig. 2, is a plan view of one end of a wing structure with a portion of the fabric cut away to show the multiple sections composing the wing surface and the bracing wires;

Fig. 3, is a section of a wing surface showing it in its contracted and deeply cambered position;

Fig. 4, is an enlarged section showing the wing surface in its expanded or normal position of normal flight;

Fig. 5, is a detail of connection between one portion of the stationary section and an intermediate section;

Fig. 6, is an enlarged section of an intermediate section, control members and portions of the leading and stationary sections;

Fig. 7, is an enlarged detail section of a portion of the leading section and intermediate section;

Fig. 8, is an enlarged section on the line 8—8 (Figure 11) of the wing surface showing the aileron controls;

Fig. 9, is a front elevation of the control mechanism for the ailerons with the wing surfaces in section;

Fig. 10, is an enlarged view of the control mechanism of the ailerons in combination with the adjustable mechanism of the wing surface.

Fig. 11 is a plan view in reduced scale of one end of a wing structure with an aileron.

Referring to the drawings, 1 is a strut having an enlarged supporting surface 2. The number of these struts between the wing surfaces in the case of a biplane is immaterial. It will be understood that my invention may be applied in a monoplane construction where suitable bracing may be employed of any well-known type. Mounted upon the head of the strut 2 is a permanent or stationary section of the wing surface designated 3. This stationary section is covered with fabric or veneer as at 4 upon spacing members or ribs 5 of which there may be any desired number located between the spars 6 and 7. These ribs contain apertures 8 for the purpose of securing lightness in the standard weight. Pivoted at 9 to a lug 10 is a link 11 which is pivoted at its other end at 12 to a lug 13 carried by the inner lower end of the trailing section 14 which is likewise composed of ribs 5 and a spar 15 and a trailing edge member 16. 17 is another link crossing link 11. 17 is pivoted at 18 to a lug 19 carried by the inner end of the trailing section and at 20 to a lug 21 carried by the stationary section on the spar 7. Between the stationary section 5 and the trailing section 14 is an intermediate section 22 which is encased by veneer or fabric 23 supported on the rib 24 of which there are a number. This section is entirely independent and a unit in itself, the members 17 and 11 of which there are a plurality merely passing through it. This intermediate section is supported at either side by a relatively loose pivotal connection at 25 and 26 upon the stationary section and the trailing section respectively.

The same construction is employed on the leading edge of the plane where the leading section 27 has a covering 28, a nose piece 29, a spar 30 and ribs 31.

Connected at 12 or any part of the trailing section is an operating rod 32 and connected at 33, or any part of the leading section, is an operating rod 34. These rods are conveyed to a winged nut 35. The connection is a pivotal one. 32 is connected to 35 at 36 and 34 is connected at 37. Control members for the lower wing surface, such as 38 and 39 are connected at 40 and 41 respectively. This nut is internally threaded and travels up and down upon the threaded actuating rod 42 which is maintained in position by the nuts 43, 43 embracing the guiding member 44.

By referring to Figure 1, this rod 42 will be seen in full where it has a sprocket 45 affixed at the bottom upon which either a chain or a cable is mounted for rotating 42 and thereby varying the camber of the wing surface. In Figure 2 the wires 46 extend from the points 47 to the points 48 crossing each other in the wing structure. There are a plurality of intermediate sections shown in this view to illustrate that phase of my invention which permits not only of a pair of intermediate sections but any desired number, depending upon the design of the wing and its size.

I have shown in Figure 4 a wing section of a standard design known as $W^1$. I have taken this as a typical section adapted for this purpose, but I do not desire to be confined to any particular section as my invention is adaptable to any type of wing design. In the restricted or deeply cambered form of Figure 3, will be seen a wing structure which conforms to a design known as U. S. A. 4, a standard wing design.

By changing from one form to the other I effect the result desired, but it will be understood that I may select any type of design for the normal wing surface and any type for the cambered surface as this depends entirely upon the particular plane in which it is employed.

Referring to Figures 8, 10 and 11, I have illustrated an aileron construction. This aileron may be of any desired span and any desired depth. It is an independent unit designated 49 covered with fabric 50 and is of the standard construction upon the inner and upper edge of which is mounted a horn 51 that extends inwardly and downwardly to the point 52 where the pin 53 passes through the jaws 54 of a lever 55. The horn 53 is prevented from becoming disengaged from 55 by a cotter pin 56 which is not essential but is a safety factor. This lever 55 is pivoted in one spar of the stationary sections as at 57. The lever 55 has a bifurcated end 58 to each part of which are attached cables 59 at 60—61. These cables pass around drums or pulleys 62 which carry them through an angle of approximately 90° allowing them to run lengthwise within the wing.

These cables appear in Fig. 9 and terminate upon the circular quadrant 63 to which they are fastened rigidly. This allows said quadrant to rotate 90° either clockwise or counter clockwise from neutral position, winding and unwinding wires 59 during the maneuver.

This quadrant has mounted upon its shaft 63 the cross arm 64 connected at either end to cables 65 that are in turn connected to another cross arm 66 mounted on a shaft 67 actuated by the control stick 68, shown in Figure 9.

It will be observed that the intermediate section (see Figure 10) may be employed and that the place of the trailing section is taken by the spar 69. To this spar is pivoted at 70 the aileron.

The gaps between the several sections may be sealed if desired by sealing members 71 and 72 that overlap each other and are mounted upon their respective sections. These sealing members may be made of aluminum or of any suitable light material. They are not essential, but desirable in that they preserve the streamline effect.

It will be observed that in this construction the streamline is maintained at all times so that no increased resistance to flight is interposed by this construction due to any structural characteristics, the only modification coming from the modification of the camber, chord, the aileron position, or, in some instances, the angle of incidence.

Method of operation.

When it is desired to have the machine climb rapidly or to land slowly the camber of the wing surface is increased and the chord shortened. This is effected by drawing down upon the control members 32, 34, and if there is a biplane surface, 39 and 38. This increases the camber of the wing surfaces. The leading member moves its leading edge downwardly while its inner lower edge moves downwardly and inwardly and its upper inner edge moves downwardly and outwardly due to the action of the links, 11 and 17. The intermediate section turns about its axis which extends along the span of the plane surface. The wing structure still maintains its streamline surface but changes its configuration. The same is true of the rear section.

The points 12 and 20 approach each other when the camber is increased and the points 9 and 19 recede from one another when the camber is increased.

It will be understood that any number of these sections may be interconnected with one another in the same way, and by the operation of a control member, such as 32, the camber of the wing surface will be changed.

When the ailerons are operated through the control lever 68 they are actuated about the pivotal point 70. The location of 70 may be changed incident to the change of the camber of the wings but this does not affect the position of the aileron because of the loose connection between 55 and 51.

If it is desired to change the angle of incidence of the plane structure then a greater throw may be provided in any well known mechanical way for one portion of the wing surface compared with another, so that its travel will not be equi-distant but will be greater compared with the travel of another portion. The angle of incidence or in other words, the angle which the chord makes with the line of flight, may thus be varied.

However, it is not essential to my construction to maintain equilateral equilibrium of the plane to vary the angle of incidence as has been heretofore the custom in the art. I am enabled by my construction by changing the camber of the wing surface on either one side or on the other of the plane to thereby increase the lift. The greater the camber, the greater the lift. This will cause a drift towards the camber of greatest degree which is compensated for by the position of the rudder, which will bring the machine back to its normal line of flight or hold it on the normal line of flight. The rudder will be turned toward the side of least camber.

It is therefore possible to operate a plane in the air without ailerons and without in any way modifying the angle of incidence established for the plane structure. So far as I am aware, this is the first time this has been accomplished and I am enabled to operate entirely and satisfactorily a plane structure of this character without the use of any warping devices, ailerons or other methods or means for changing the angles of incidence.

Having thus fully described my invention, what I claim as new and desire to secure by Letters Patent, is:—

1. In a flying machine, a supporting plane comprising a fixed portion, an adjustable portion, an intermediate portion between the other portions, and adjusting connections including rigid elements extending through the intermediate portion and connecting the first mentioned portions, whereby the depth between the chord and supporting surface may be varied.

2. In a flying machine, a supporting plane comprising a fixed portion, adjustable portions on either side thereof, intermediate portions between the fixed and adjustable portions and rigid adjusting connections between said fixed portion and adjustable portions extending through the intermediate portions, whereby the depth between the chord and supporting surface may be varied.

3. In a flying machine, a supporting plane comprising a fixed portion and an adjustable portion, an intermediate portion between the fixed portion and an adjustable portion adapted to be adjusted in position to maintain a streamline surface between said fixed portion and adjustable portion, and rigid adjusting connections between said fixed portion and adjustable portion extending through the intermediate portion, whereby the depth between the chord and supporting surface may be varied.

4. In a flying machine, a supporting plane comprising a fixed portion and adjustable portions on either side thereof, intermediate adjustable portions between the fixed portion and the adjustable portions, and means for effecting the adjustment of the adjustable portions and the intermediate portions, whereby the depth between the chord and the supporting surface may be varied while a streamline surface of the plane is maintained.

5. In combination in a flying machine, a plane structure composed of a stationary section, a leading edge section, a trailing edge section, a link connecting the upper inner end of the trailing edge section to the lower rear end of the stationary portion, an operating control connected to said trailing edge section for moving its outer edge downwardly and its inner lower edge downwardly and inwardly, whereby the curvature of the plane will be altered while the streamline surface is maintained.

6. In combination in a flying machine, comprising a supporting plane structure, a stationary portion of said structure, a leading edge portion, a trailing edge portion, both of which are adapted to be adjusted in their position with respect to the stationary portion, means including pivoted joints for connecting said trailing edge portion and leading edge portion to the stationary section, means for actuating said trailing edge portion and leading edge portion, whereby their outer ends will be drawn downwardly in curved paths and their edges will likewise travel in curved paths, the lower inner edges thereof traveling downwardly and inwardly and the upward inner edges thereof traveling downwardly and outwardly, whereby the curvature of the plane surface may be varied.

7. In combination, in a flying machine, a plane structure composed of a plurality of sections, comprising a stationary section, a leading edge section, a trailing edge section, a link connecting the lower edge of the stationary section with the upper inner edge of the trailing section, a second link connecting the upper edge of the stationary section with the lower inner edge of the trailing section, and means connected at the point of connection of the second link with the lower inner edge of the trailing section for the purpose of actuating said trailing section and the links, whereby the outer end of the trailing section moves in a curved path, the inner lower edge of the same moves downwardly and inwardly and the upper inner edge moves downwardly and outwardly.

8. In combination, in a flying machine, a plane structure composed of a plurality of sections, comprising a stationary section, an adjustable leading edge section, a trailing edge section, a link connecting the lower edge of the stationary section with the upper inner edge of the trailing section, a second link connecting the upper edge of the stationary section with the lower inner edge of the trailing section, means connected at the point of connection of the second link with the lower inner edge of the trailing section for the purpose of actuating said trailing section and the links, whereby the outer end of the trailing section moves in a curved path, the inner lower edge of the same moves downwardly and inwardly and the upper inner edge moves downwardly and outwardly, a link connecting the lower inner edge of the adjustable leading section to the upper forward edge of the stationary section, a second link connecting the upper inner edge of the leading section to the forward lower edge of the stationary section, and means connected to the lower inner edge of the leading section, whereby said sections may be actuated to change the curvature of the plane surface while maintaining the streamline effect.

9. In combination, in a flying machine, comprising a plane structure, a central stationary section, a leading edge section, a trailing adjustable edge section, an intermediate section between said trailing edge section and stationary section, pivotally connected to said stationary section and trailing section and supported thereby, and adapted to move about its pivotal connection with the stationary section and with the moving trailing section, crossed link connections between said trailing section and stationary section, interconnecting said stationary section and trailing section, the points of connection of said links with a stationary and adjustable section and the pivotal connection between the intermediate section and said other sections being on the same straight line respectively on either side of the intermediate section, and means connected to the trailing section for actuating said trailing section, links and intermediate section, whereby the curvature of the plane surface may be varied while the streamline structure is maintained.

10. In a plane structure comprising a stationary section, an intermediate section, an adjustable section including an aileron section, said adjustable section being pivoted on the intermediate section and linked at its upper inner edge to the lower inner edge of the stationary section and its lower inner edge to the upper edge of the stationary section and pivoted to the intermediate section which moves therewith on one side and pivoted on the other side to the aileron section, and means for moving said adjustable section so that its upper portion moves downwardly and outwardly and its lower portion moves downwardly and inwardly, and supplementary means for effecting an increased movement of the aileron section so that the outer edge thereof will move in an arc of a circle independently of the remainder of the plane structure about its pivotal point of connection with the adjustable section.

11. In a plane structure comprising a stationary section, an intermediate section, and an adjustable section including an aileron section, said adjustable section being pivoted on one side of the intermediate section and linked at its upper inner edge to the lower inner edge of the stationary section and its lower inner edge to the upper edge of the stationary section, the intermediate section being movable with the adjustable section and the aileron section being pivoted on one side of the adjustable section, and means for moving said adjustable section so that its upper inner edge portion moves downwardly and outwardly and its lower portion moves downwardly and inwardly, supplementary means for effecting an increased movement of the aileron section so that the outer edge thereof will move in an arc of a circle independently of the remainder of the plane structure about its pivotal point of connection with the adjustable section, and an adjustable leading edge section connected to the stationary section, an intermediate section between said leading edge section and the stationary section, and means for effecting the adjustment of the leading edge section.

12. In combination, in an airplane, a plane structure comprising a stationary section, intermediate sections on either side thereof, an adjustable leading edge section on one side of one intermediate section, an adjustable trailing section on the other side of the other intermediate section and including an aileron section, links passing through the intermediate sections and connecting the adjustable sections to the stationary section the intermediate sections being pivoted to the adjustable sections and the stationary section, the aileron section being pivoted on one side of one of the adjustable sections, a horn mounted on the aileron section and projected into the wing structure, a tiller pivotally and loosely connected to said horn, and means for actuating said tiller.

13. In combination, in an airplane, a plane structure comprising a stationary section, intermediate sections on either side thereof, a leading edge section, an adjustable section including an aileron section, links passing through one of the intermediate sections and connecting the adjustable section to the stationary section, the intermediate sections being pivoted to the adjustable section, the leading edge section and the stationary section, the aileron section being pivoted on the adjustable section, a horn mounted on the aileron section and projected into the wing structure and pivotally and loosely connected to a tiller, a tiller, means for actuating said tiller to connect it to a control, a control, and means to seal the gaps between the sections to preserve a stream line surface in the several adjusted positions.

14. In combination, in an airplane, a plane structure comprising a stationary section, intermediate sections on either side thereof, adjustable sections pivoted to and interconnected with the intermediate sections, and ailerons forming a portion of one of said adjustable sections and pivoted to said adjustable section, means for moving the intermediate sections, adjustable sections and ailerons as a unit to vary the length of the chord of the plane structure and the camber thereof and independent means for moving the ailerons with respect to the remainder of the plane structure.

15. In combination, in an airplane, a plane structure comprising a stationary section, intermediate sections on either side thereof, adjustable sections pivoted to and interconnected with the intermediate sections, and ailerons forming a portion of one of said adjustable sections and pivoted to said adjustable section, means for moving the intermediate sections, adjustable sections and ailerons as a unit to vary the length of the chord of the plane structure and the camber thereof, independent means for moving the ailerons with respect to the remainder of the plane structure, a control, and interconnecting means connecting said ailerons to the control.

16. In combination, a supporting member connecting an upper and lower plane surface to one another, stationary sections mounted on said supporting member, adjustable sections adjacent thereto in each plane surface connected to said stationary section, and means connected to said adjustable sections of each plane surface to actuate them and vary the camber of the respective plane surfaces, an internally threaded member connected to said actuating means, a threaded member turning in said internally threaded member, means maintaining said threaded member in position, and controlling means for actuating said threaded member whereby the camber of the plane surfaces may be adjusted.

17. In a flying machine, a supporting plane comprising a fixed portion and adjustable portions on either side thereof, intermediate adjustable portions between the fixed portion and the adjustable portions, and means for effecting the adjustment of the adjustable portions and the intermediate portions, each of said unitary portions being covered with fabric to form a unitary structure, whereby the depth between the chord and the supporting surface may be varied while a streamline surface of the plane is maintained.

18. In an airplane, a stationary wing section, intermediate wing sections arranged on the front and rear of the stationary section, adjustable wing sections arranged to the front and rear of said intermediate sections, one of the adjustable sections including an aileron section, means for simultaneously moving the intermediate and adjustable sections relatively to the stationary section, and means for moving the aileron section independently of the other sections.

In testimony whereof, I affix my signature.

GEORGE B. POST.